United States Patent
George et al.

(10) Patent No.: US 11,597,347 B2
(45) Date of Patent: Mar. 7, 2023

(54) METHODS AND SYSTEMS FOR DETECTING WHETHER A SEAT BELT IS USED IN A VEHICLE

(71) Applicant: Aptiv Technologies Limited, St. Michael (BB)

(72) Inventors: Amil George, Wuppertal (DE); Alexander Barth, Wermelskirchen (DE)

(73) Assignee: Aptiv Technologies Limited, St. Michael (BB)

( * ) Notice: Subject to any disclaimer, the term of this patent is extended or adjusted under 35 U.S.C. 154(b) by 163 days.

(21) Appl. No.: 17/141,114

(22) Filed: Jan. 4, 2021

(65) Prior Publication Data

US 2021/0206344 A1 Jul. 8, 2021

(30) Foreign Application Priority Data

Jan. 7, 2020 (EP) ................................ 20150594
Dec. 15, 2020 (EA) ................................ 20214085

(51) Int. Cl.
*G06V 10/24* (2022.01)
*B60R 22/48* (2006.01)
*G06V 20/59* (2022.01)

(52) U.S. Cl.
CPC .......... *B60R 22/48* (2013.01); *G06V 20/593* (2022.01); *B60R 2022/4808* (2013.01)

(58) Field of Classification Search
CPC .............................. G06V 10/24; G06V 20/593
See application file for complete search history.

(56) References Cited

U.S. PATENT DOCUMENTS

| | | | |
|---|---|---|---|
| 8,611,608 B2 | 12/2013 | Fan et al. | |
| 10,691,955 B1 * | 6/2020 | Correia Gracio | .... G06K 9/6253 |
| 10,773,683 B1 | 9/2020 | Ghannam et al. | |
| 10,953,850 B1 | 3/2021 | Pertsel et al. | |
| 2009/0058061 A1 | 3/2009 | Fuisz et al. | |
| 2017/0291576 A1 | 10/2017 | Le et al. | |
| 2019/0147262 A1 | 5/2019 | Kuehnle et al. | |
| 2019/0197326 A1 | 6/2019 | Ohno et al. | |

(Continued)

FOREIGN PATENT DOCUMENTS

| | | |
|---|---|---|
| CN | 2756044 | 2/2006 |
| CN | 104417489 A | 3/2015 |

(Continued)

OTHER PUBLICATIONS

"Extended European Search Report", European Application No. 20150594.8, dated Jul. 17, 2020, 7 pages.

(Continued)

*Primary Examiner* — Sam Bhattacharya
(74) *Attorney, Agent, or Firm* — Sawtooth Patent Group PLLC

(57) ABSTRACT

A computer implemented method for detecting whether a seat belt is used in a vehicle comprises the following steps carried out by computer hardware components: acquiring an image of an interior of the vehicle; determining a plurality of sub-images based on the image; detecting, for at least one of the sub-images, whether a portion of the seat belt is present in the respective sub-image; and determining whether the seat belt is used based on the detecting.

20 Claims, 3 Drawing Sheets

(56) References Cited

U.S. PATENT DOCUMENTS

| | | | |
|---|---|---|---|
| 2020/0231109 A1 | 7/2020 | Baltaxe et al. | |
| 2020/0298794 A1 | 9/2020 | Dingli | |
| 2020/0298796 A1 | 9/2020 | Cech et al. | |
| 2021/0086715 A1* | 3/2021 | Baek | G06N 3/0445 |
| 2022/0227331 A1 | 7/2022 | Uszkur et al. | |

FOREIGN PATENT DOCUMENTS

| | | |
|---|---|---|
| CN | 104700068 A | 6/2015 |
| CN | 105109448 A | 12/2015 |
| CN | 105667450 A | 6/2016 |
| CN | 105946786 B | 12/2018 |
| CN | 109886205 A | 6/2019 |
| CN | 110053582 A | 7/2019 |
| DE | 10133759 C2 | 7/2003 |
| DE | 10326840 A1 | 12/2004 |
| DE | 102007008602 A1 | 11/2007 |
| DE | 102016014867 A1 | 6/2017 |
| DE | 102019101355 A1 | 7/2019 |
| DE | 102019211200 A1 | 2/2021 |
| EP | 1980452 A1 | 10/2008 |
| EP | 2937251 | 10/2015 |
| FR | 2877279 A1 | 5/2006 |
| JP | 2007055294 A | 3/2007 |
| JP | 2010113506 A | 5/2010 |
| JP | 2015066983 A | 4/2015 |
| JP | 2020073372 A | 5/2020 |
| WO | 2018213346 | 11/2018 |

OTHER PUBLICATIONS

"Extended European Search Report", EP Application No. 20214085.1, dated Jun. 9, 2021, 7 pages.

"Extended European Search Report", EP Application No. 21215512.1, dated Jun. 3, 2022, 7 pages.

"Search Report", GB Application No. 2100619.2, dated Jun. 18, 2021, 1 page.

"Extended European Search Report", EP Application No. 22178711.2, dated Nov. 9, 2022, 8 pages.

"Foreign Office Action", CN Application No. 202110003234.1, dated Sep. 20, 2022, 16 pages.

* cited by examiner

METHODS AND SYSTEMS FOR DETECTING WHETHER A SEAT BELT IS USED IN A VEHICLE

CROSS-REFERENCE TO RELATED APPLICATIONS

This application claims priority to European Patent Application Number 20214085.1, filed Dec. 15, 2020, which in turn claims priority to European Patent Application Number 20150594.8, filed Jan. 7, 2020, the disclosures of which are hereby incorporated by reference in their entireties herein.

TECHNICAL FIELD

The present disclosure relates to methods and systems for detecting whether a seat belt is used in a vehicle, in particular whether the seat belt is properly used or used in a way that it is intended to use.

BACKGROUND

Safety belts (in other words: seat belts) are one of the most important safety measures in vehicles. However, a safety belt may be effective only if it is used, and if it is used properly.

Nowadays, the standard for detecting whether people in a car are buckled up is to use a sensor in the buckle receiver. The method is reliable and has a high accuracy. However, the information whether this sensor is detecting a seat belt in the buckle receiver does not indicate whether the seat belt is worn properly. For example, another seat belt (e.g. spare part) may be plugged in the buckle receiver instead of the real seat belt buckle, or the seat belt may be connected and the passenger may sit in front of it or on top of it.

Furthermore, if the seats are removable and adjustable on sliders or turnable (e.g. in a van), the wiring of the sensors in the buckle receiver can also be a challenge as connectivity has to be ensured for all configurations.

SUMMARY

The present disclosure provides a computer implemented method, a computer system and a non-transitory computer readable medium according to the independent claims. Embodiments are given in the subclaims, the description and the drawings.

In one aspect, the present disclosure is directed at a computer implemented method for detecting whether a seat belt is used (or worn or applied) in a vehicle, the method comprising the following steps performed (in other words: carried out) by computer hardware components: acquiring an image of an interior of the vehicle; determining a plurality of sub-images based on the image; detecting, for at least one of the sub-images, whether (at least) a portion of the seat belt (for example a portion of the strap of the seat belt or a portion of the buckle of the seat belt) is present in the respective sub-image; and determining whether the seat belt is used (for example properly used or used in a way that it is intended to use) based on the detecting.

In other words, an image may be acquired, and several sub-images (which may be crops of the image, and which may be referred to as patches, and which may be rectangular or have any other shape, with boundaries of the sub-images parallel or non-parallel to the boundaries of the image) may be determined, and detection may be carried out on these sub-images. The method may provide a visual four point seat belt verification.

If the seats are removable and adjustable on sliders or turnable (e.g. in a van), the wiring of the conventional sensors in the buckle receiver may be a challenge as connectivity has to be ensured for all configurations. In such case, with the vision based method according to various embodiments, a non-contact solution for detection of properly worn seat belts may be provided, which may reduce system complexity and cost.

With the vision-based method according to various embodiments, false detections of commonly used seat belt detection approaches may be overcome by analyzing whether the seat belt is actually routed properly along the passenger body. In addition, if interior cameras are available for other features such as driver monitoring or cabin monitoring, the sensors in the buckle receivers may be removed to save costs.

According to another aspect, the detecting comprises determining an estimated probability that a portion of the seat belt is present in the respective sub-image. For example, if a probability that a portion of the seat belt is present in the respective sub-image is in a mid-range (for example between 30% and 70%, or between 40% and 60%, or at about 50%), it may be determined that a detection whether the portion of the seat belt is present in the present sub-image is not possible. In such cases, the detection whether a portion of the seat belt is present in the present sub-image may provide a result of "unknown". This may allow for occlusions or 'unknown' cases being detected but not classified as "portion of seat belt not present". It will be understood that a "mid-range" includes probabilities for which a clear indication of "portion of seatbelt present" or "portion of seatbelt not present" is not possible or not appropriate.

According to another aspect, it is determined whether a seat belt is (properly) used based on the plurality of estimated probabilities for the at least one sub-images. The probability may be used to accumulate processing results, and to allow a more sophisticated determination other than a mere "yes" or "no" determination.

According to another aspect, the detecting is carried out sequentially (i.e. for one sub-image after the other), wherein processing the detecting is stopped and it is determined that the seat belt is not (properly) used, if for the present sub-image, it is detected that a portion of the seat belt is not present (for example if it is determined that a probability of the seat belt being present is below pre-determined threshold) in the present sub-image. This may reduce computational efforts.

According to another aspect, the detecting is carried out sequentially (i.e. for one sub-image after the other), wherein processing the detecting is stopped and it is determined that an indication whether the seat belt is used is not possible, if for the present sub-image it is detected that a portion of the seat belt is occluded in the present sub-image.

According to another aspect, the detecting is carried out sequentially (i.e. for one sub-image after the other), wherein processing the detecting is stopped and it is determined that an indication whether the seat belt is used is not possible, if for the present sub-image it is determined that a detection whether the portion of the seat belt is present in the present sub-image is not possible (for example because the detection whether a portion of the seat belt is present in the present sub-image provides a result of "unknown").

According to another aspect, the image is acquired by at least one of a 2D camera, a black-and-white camera, a color camera, a color-infrared camera, a near infrared camera, or a Time of Flight camera. The respective camera may also be used for other tasks in the vehicle, for example for driver monitoring or driver state detection.

According to another aspect, an occupancy status (for example "empty" or "occupied") of a seat corresponding to the seat belt may be determined based on the detecting. For example, if it is determined that the seat is occupied, safety measures in case of an accident may be taken to protect the passenger occupying the seat.

According to another aspect, if a seat occupancy status is available from another module, for example, another processing step using the same sensor input, or from another sensor, e.g. weight sensor in the seat, the signal provided by the other module may also be included in the computation of the final seat belt status. For example, if it is determined that there is a very low likelihood of the seat being occupied based on the other module, the parameters of the seat belt detector may be modified, e.g. by increasing the classification thresholds for "seat belt on" for an empty seat.

According to another aspect, a seat belt status (for example "belt off" (i.e. not used or not worn), "belt on" (belt used or worn), "likely belt on", or "likely belt off") may be determined based on the detecting. Based on the determined seat belt status, a warning message may be provided to the occupant of the vehicle.

According to another aspect, a (seat belt) routing status (for example "properly routed", "below shoulder", "behind back") of the seat belt may be determined based on the detecting. Based on the determined routing status, a warning message, or an instruction how to obtain a correct routing may be provided to the occupant of the vehicle.

According to another aspect, an occlusion status of the seat belt (for example "seat belt occluded by other body parts", "seat belt occluded by clothing", "seat belt occluded by object on lap") may be determined based on the detecting. For example, if it is determined that the seat belt is occluded by an object on the occupant's lap, safety measures in case of an accident may be taken to protect the passenger occupying the seat, for example by selectively activating the airbag to avoid the object on the occupant's lap hurting the occupant. It will be understood that "occluded" may mean that the seat belt is (at least partially) not visible on the acquired image, for example because another object is located between the seat belt and the sensor (for example camera) that acquires the image.

According to another aspect, a location of at least one body key point (of an occupant of the vehicle that is supposed to wear the seat belt) may be determined based on the image, and the plurality of sub-images may be determined based on the determined location of the at least one body key point. This may allow for compensation of various seating positions, wherein with a varying seating position also the position of the seat belt varies.

According to another aspect, it may be determined whether a portion of the seat belt is occluded and/or which portions of the seat belt are occluded based on the image. According to another aspect, at least one of the following steps may be carried out if it is determined that a portion of the seat belt is occluded: prompting a user to remove the occluding object; adapting the determination of the sub-images so that the sub-images show unoccluded portions of the seat belt; postponing the detecting until the portion of the seat belt is no longer occluded; or predicting the results of the detecting based on an earlier detecting. This may allow for obtaining results only when the seat belt is not occluded.

According to another aspect, the detecting is carried out using a classifier.

For example, the classifier may classify the object or objects shown on the sub-image. For example, the classifier may classify a sub-image (in other words: the entire sub-image, or the full sub-image) into "showing at least a portion of the seat belt" or "not showing the seat belt"; it will be understood that classification into another set of classes may be provided, for example "showing at least a portion of the seat belt with a probability of less than 30%", "showing at least a portion of the seat belt with a probability between 30% and 70%", or "showing at least a portion of the seat belt with a probability of more than 70%".

In another example, the classifier may classify each pixel in the sub-image. The classifier may classify each pixel into a class of "pixel belonging to the seat belt" or a class of "pixel not belonging to the seat belt". Alternatively, the classifier may assign a probability (or a range of probability in order to keep the number of classes low) to belong to the seat belt or not. The resulting probabilities may be represented as probability maps (in other words: images) and, in a second step, these maps may be further processed and classified as "seat belt present/not present/present, but wrongly used", or the like. The second step may be carried out by another neural network or any other classification method.

According to another aspect, the detecting is carried out using a (artificial) neural network, for example a convolutional neural network.

According to another aspect, the plurality of sub-images are determined based on cropping the image and transforming each of the cropped image using a perspective transformation. The perspective transformation (in other words: visual transformation) may be selected so that the seat belts are oriented perpendicular to the major axis of the box. The perspective transformation and/or a crop of the sub-images may ensure that a portion of seatbelt in the image for all various possible (or feasible or valid) seat positions. Furthermore, this may allow using the same classifier or artificial neural network for all of the sub-images that are related to the strap of the seat belt. A separate classifier or artificial network may be used for sub-images that are related to the buckle of the seat belt.

In another aspect, the present disclosure is directed at a computer system, said computer system comprising a plurality of computer hardware components configured to carry out several or all steps of the computer implemented method described herein. The computer system can be part of a vehicle.

In another aspect, the present disclosure is directed at a vehicle, comprising the computer system and at least one sensor configured to acquire the image of the interior of the vehicle.

The computer system may comprise a plurality of computer hardware components (for example a processing unit, at least one memory unit and at least one non-transitory data storage). It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Based on the issues described in the Background, there is a need to improve seat belt detection.

According to various embodiments, use may be mode of the knowledge of car interior to efficiently perform seat occupancy and belt status verification. The knowledge of the car interior along with the fact that there is a constant camera viewpoint may permit making certain assumptions about the normal seating positions of people in the car.

A system according to various embodiments for detecting whether a seat belt is properly used in a vehicle may include at least one vision sensor (for example 2D (two-dimensional) RGB (red-green-blue) sensor, RGB-IR (infrared) sensor, NIR (near infrared) sensor, or a time of flight sensor), a processing unit receiving the images and computing the output signal, and a signaling unit providing an output signal to at least one receiving unit.

The camera may be positioned at various positions in the vehicle, for example, in the proximity of the rear view mirror, the roof, the center display area, in the A-pillars, B-pillars, or above the $2^{nd}$ row.

More than one camera may be provided, so that it may be possible to fuse the information from multiple cameras in the processing unit.

According to various embodiments, the seat belt may be equipped with markers. Such markers may be, for example, reflective in the IR spectrum and induce characteristic patterns in the image plane of the vision sensor that can be detected and processed by a method according to various embodiments.

Figure 1:
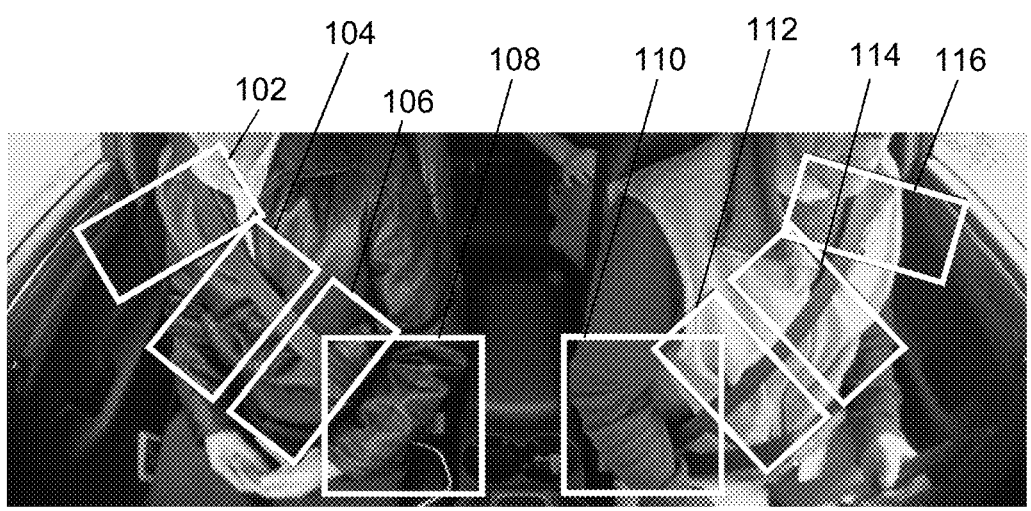
FIG. 1 an illustration of an image acquired according to various embodiments.

FIG. 1 shows an illustration 100 of an image acquired according to various embodiments. Sub-images 102, 104, 106, 108, 110, 112, 114, 116 are illustrated by white frames. The acquired image may be cropped according to the white frames to obtain the sub-images. The sub-images 108 and 110 are located at the position of the buckle, while the other sub-images 102, 104, 106, 112, 114, 116 are located at the position of the seat belt strap if used properly.

According to various embodiments, different classifiers (for example (artificial) neural networks) may be provided for evaluation of the sub-images related to the buckle and for the sub-images related to the strap. The classifier for the sub-images related to the buckle may detect whether the seat belt is buckled or not (for example by detecting whether a buckle is visible in the sub-image or not). The classifier for the sub-images related to the strap may detect if the frontal seat belt is visible in the sub-image (in other words: patch) or not.

The sub-images or patches for each location related to the strap may be selected and perspectively transformed such that the seat belts are oriented perpendicular to the major axis of the box (within a given tolerance). Since the camera mounting location and the seat positions is known, it is possible to use static transformation parameters for each patch. This sub-image transformation may allow making all patches look similar for all seating positions in the car. This allows us to train and reuse one single classifier for all the seating positions in the car and reduce the data collection efforts, in particular for training the classifier.

The classifiers (for example artificial neural networks) may be trained, for example by providing (sub-)images and information on what is actually shown on the images (or whether a buckle or strap is actually shown on the image or not), and the artificial neural network may learn (using machine learning approaches) to correctly evaluate not only images that were used for trainings, but also any (sub-) images that are determined during normal operation (i.e. after training).

According to various embodiments, a safety score or weighted classifier score may be determined. For example, the safety score may be a function of whether the person is in position and wearing the seat belt. Each person's safety score may be calculated based on the output from the various sub-images (in other words: patches, for example from four patches). Each patch may be assigned a max score $S_{patch}$ that it can contribute. The final safety score for an occupant of at any time point may then be computed as $$SafetyScore_{o1} = S_{b0} * BuckleClassifier(b0) + \sum_{k=0}^{n} S_k * StrapClassifier(c_k)$$

wherein $S_{b0}$ and $S_k$ are weights, BuckleClassifier(b0) denotes a score related to whether (a portion of) a buckle is shown on the respective sub-image (for example sub-image 108 (for the passenger) or 110 (for the driver) as shown in FIG. 1), and StrapClassifier($c_k$) denotes a score related to whether (a portion of) a strap of a seat belt is shown on the k-th sub-image related to the strap (for example sub-image 102, 104, 106 (for the passenger) or 112, 114, 116 (for the driver) as shown in FIG. 1)

According to various embodiments, an occupant state model may be provided.

Figure 2:
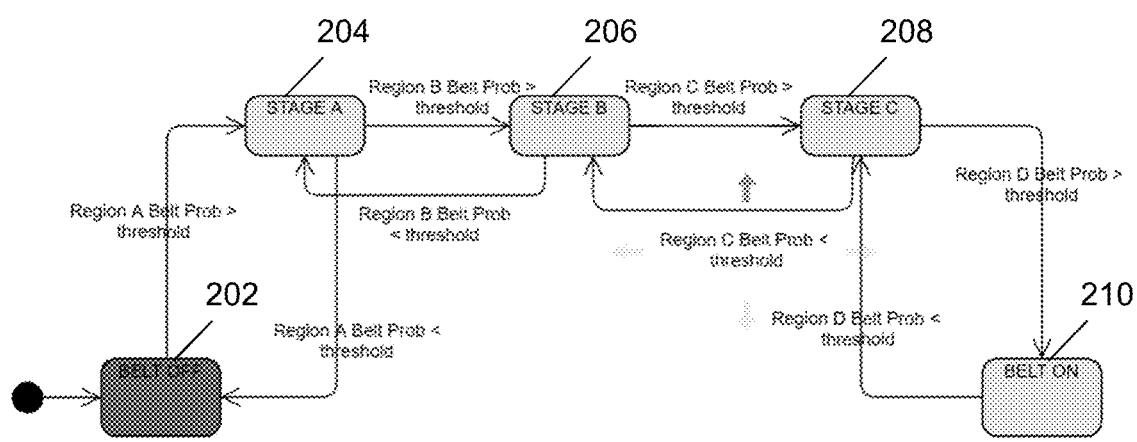
FIG. 2 an illustration of an occupant state model according to various embodiments.

FIG. 2 shows an illustration 200 of an occupant state model according to various embodiments. Various states are illustrated by boxes in FIG. 2, and conditions for switching between the states are illustrated by arrows in FIG. 2. Region A, region B, region C, and region D may refer to four different patches, for example to sub-images 102, 104, 106, 108 of FIG. 1. It will be understood that the number of sub-images is not restricted to four but may be any integer number. It will be understood that the sequence (in other words: order) in which the patches are processed is not restricted to the processing shown in FIG. 2, but the patches may be processed in any other sequence.

Processing may start at a belt off state 202 (i.e. a state in which it is assumed that the occupant is not wearing the belt). If the probability that a portion of the belt (in particular of the strap of the belt) is present in region A is higher than a pre-determined threshold, it may be switched to a first stage (stage A 204).

At stage A 204, if the probability that a portion of the belt is present in region B is higher than the pre-determined threshold, it may be switched to a second stage (stage B 206), and if the probability that a portion of the belt is present in region A is lower than the pre-determined threshold, it may be switched back to the belt off stage 202.

At stage B 206, if the probability that a portion of the belt is present in region C is higher than the pre-determined threshold, it may be switched to a third stage (stage C 208), and if the probability that a portion of the belt is present in region B is lower than the pre-determined threshold, it may be switched back to the stage A 204.

At stage C 208, if the probability that a portion of the belt is present in region D is higher than the pre-determined threshold, it may be switched to a belt on stage 210 (i.e. a state in which it is assumed that the occupant is wearing the belt), and if the probability that a portion of the belt is present in region C is lower than the pre-determined threshold, it may be switched back to the stage B 206.

At the belt on stage 210, if the probability that a portion of the belt is present in region D is lower than the pre-determined threshold, it may be switched back to the stage C 208.

It will be understood that the various thresholds illustrated in FIG. 2 may be identical or different, for example the thresholds for proceeding forward to a next stage may be higher than the respective threshold for going back to that stage, to introduce a hysteresis to avoid frequent (back and forth) switching between stages.

According to various embodiments, the discrete intermediate states (stages A, B, C) may be used for interactive visualization, for example for animating a 3D (three-dimensional) model.

With the processing as illustrated in FIG. 2, processing requirements may be reduced, since at each time point, there is no need run the classifier on the entire image. For example, once stage B is confirmed, it may be sufficient to only run the classifier on the next patch (in order to determine whether to proceed to stage C).

Furthermore, with the processing as illustrated in FIG. 2, partial occlusions may be handled.

According to various embodiments, based on the camera images, an output for each seating position may be determined, for example an occupancy status of the seat (for example "empty" or "occupied"), a current seat belt status (for example "belt off", "belt on", "likely belt on", "likely belt off"), a (belt) routing status (for example "properly routed", "below shoulder", "behind back") and/or an occlusion status (for example "seat belt occluded by other body parts", "seat belt occluded by clothing", "seat belt occluded by object on lap").

Figure 3:
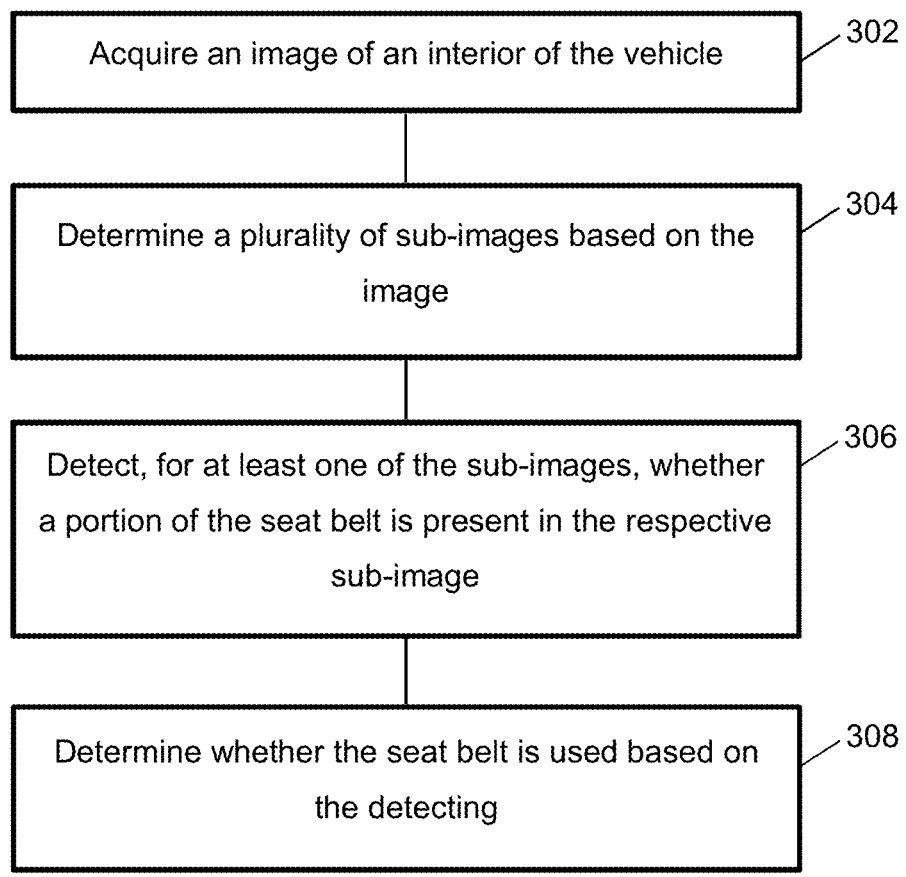
FIG. 3 a flow diagram illustrating a method for detecting whether a seat belt is used in a vehicle according to various embodiments.

FIG. 3 shows a flow diagram 300 illustrating a method for detecting whether a seat belt is used in a vehicle according to various embodiments. At 302, an image of an interior of the vehicle may be acquired. At 304, a plurality of sub-images may be determined based on the image. At 306, for at least one of the sub-images, it may be detected whether a portion of the seat belt is present in the respective sub-image. At 308, it may be determined whether the seat belt is used based on the detecting.

It will be understood that determining the sub-images at step 304 includes (or is) a determination of respective locations (or positions) of the sub-images in the image. Several ways of how the sub-images are located may be provided.

According to various embodiments, the sub-images may be located at configurable, static positions in the image. The sub-images may be adjusted at a calibration step for different car interiors, and/or for different camera viewpoints, and/or for different seat positions. This may be referred to as a static approach.

According to various embodiments, the sub-images may be located (in other words: placed) dynamically relative to detected body key points, e.g. shoulders, hip points, in the image. This may be referred to as a dynamic approach.

According to various embodiments, a combination of the static approach and the dynamic approach may be provided. For example, the location of sub-images may be derived from a time series of body key points where pre-dominant positions of body key points, e.g. shoulders or hips, may be accumulated over time for stabilization of the regions, thus being less dependent on the frame by frame detection of a body key point detector or to save processing time by not requiring to recompute body key points for every frame in order to update the seat belt status. At the same time, this combined approach may be more flexible than fixed regions in the static approach.

According to various embodiments, parameters of an analysis of the time series of images may be adapted based on further signals from the vehicle, for example to make the placement of the sub-images more responsive to the more recent measurements (so that a faster change is possible; this may also be referred to as a more dynamic placement). For example, the signals from the vehicle may include signals indicating whether a seat has been moved. For example, the placement may be less dynamic if the seat has not moved for long time, and the placement may be more dynamic if the seat has been adjusted recently.

The parameters of the analysis may for example be a frequency of the placement (which may for example indicate how frequently the position of the sub-images is adjusted, for example every 1 second, or every 5 seconds, or every minute).

Placement in this context may refer to placing (or positioning) the sub-images within the full image (which may be understood as setting the search region). In the above example, if the seat position is changed (for example by moving the seat back or forth), the regions where the seat belt is expected may change.

In the combined approach, the sub-images may be placed based on accumulated statistics of the occurrence of body key points, and some parameters may be set on how fast the sub-image placement should react on changes of the body key points.

For example, it may be desired that this process is rather slow, so that small body movements do not change the location or place of the sub-images.

However, if the seat is adjusted (which may be known for example via a signal on the vehicle bus which indicates that the seat position has been changed), the settings may be changed to respond faster to changes in the body key points.

In this case, the sub-image may be moved faster to the current position of the shoulders, for example.

According to various embodiments, determination of the sub-images may be combined with a user ID (identifier). The user ID may, for example, be determined using face identification or another identification method. By using the user ID, customized sub-image regions may be set for a given user.

According to various embodiments, the outputs of the different sub-image classifiers may be fed into a graphical inference model, additional neural network, or other data driven machine learning method. The result may be obtained from a single time instance or from a sequence of observations, e.g. using recurrent neural network architectures or LSTM.

In one embodiment, the seat buckle state result may be derived via a Hidden Markov Model, where the hidden state is the seat belt status, while the observations are the results from the sub-image classifiers. The state transitions probabilities and emission likelihoods for the observations may be predefined or learned from training data.

According to various embodiments, the detecting comprises determining an estimated probability that a portion of the seat belt is present in the respective sub-image.

According to various embodiments, it is determined whether a seat belt is used based on the plurality of estimated probabilities for the at least one sub-images.

According to various embodiments, the detecting is carried out sequentially, wherein processing the detecting is stopped and it is determined that the seat belt is not used, if for the present sub-image, it is detected that a portion of the seat belt is not present in the present sub-image.

According to various embodiments, the image is acquired by at least one of a 2D camera, a black-and-white camera, a color camera, a color-infrared camera, a near infrared camera, or a Time of Flight camera.

According to various embodiments, the method further comprises determining an occupancy status of a seat corresponding to the seat belt based on the detecting.

According to various embodiments, the method further comprises determining a seat belt status based on the detecting.

According to various embodiments, the method further comprises determining a routing status of the seat belt based on the detecting.

According to various embodiments, the method further comprises determining an occlusion status of the seat belt and/or a body pose of the occupant and/or body key points of the occupant and/or objects in a vicinity of the occupant based on the detecting.

According to various embodiments, the detecting is carried out using a classifier.

According to various embodiments, the detecting is carried out using a neural network.

Occlusions of a seat belt may be caused by body parts, clothing, and objects, as well as other coverage of the sensor blocking the line of sight (e.g. a sticker on the camera lens). According to various embodiments, a camera self-test module may check the image content as part of a self-diagnostic service from time to time to ensure that the data acquired by the camera is valid (e.g. not blurred, frozen, oversaturated, too dark, etc.) and the camera is not blocked by a close by object. This step may also contain one or more neural networks.

The system may be coupled with a body key point detection module to further optimize and improve the patch selection process and occlusion prediction. Such module may detect 2D or 3D key points of a body (such as shoulder, hips, elbow, hands, knees, etc.). According to various embodiments, the key points are computed using a neural network. This network may run on the full image or on a different sub-image, not necessarily related to the seat belt crops.

Knowing the position of the shoulder and hip body key points may allow to determination of an adaptive cropping of the seat belt sub-images containing the strap and buckle using parameters relative to the key point locations in the image or in 3D space.

Moreover, the body key point module may be used to determine if the seat belt region would be occluded with a body part. For example if the hand key points fall into a sub-image of the strap, the sub-image may be classified as occluded with "seat belt occluded by other body parts" and choose to delay running the seat belt classifier on the particular sub-image or to select a more suitable sub-image that is not occluded. The same concept may be extended by assuming that 2 key points are connected e.g. by an arm and therefore a linear band between 2 or more points (skeleton) may also be used for prediction of occlusions.

An object detection module may also be used to determine if the seat belt may be occluded. An object detection or segmentation module may be used to determine the region that is occluded by the object. For example, if an object such as a bag or laptop is placed on the lap of a person on the seat, it may partially or completely occlude the seat belt region.

In case occlusions are detected, they may be handled within the system in several ways.

In an interactive approach, a user may be prompted to move the occluding object or part. When the system determines that the belt region is no longer occluded, the system may run the seat belt classifiers and may re-assess the state.

In a dynamic sub-image selection approach, the system may attempt to select only sub-images that do not fall within occluded regions. If there are sufficient (for example at least 2) regions that are not occluded, the system may produce an output, but the overall confidence may be lower than if all regions are visible.

In a waiting approach (which may be referred to as TimeWait approach), the system may wait for some time for the sub-image to reach the unoccluded state before running the classifier again on the sub-image.

In a prediction approach, the previous result or likely result of the patch may be estimated by extrapolating the result of previous time period.

According to various embodiments, the plurality of sub-images are determined based on cropping the image and transforming each of the cropped image using a perspective transformation.

Each of the steps 302, 304, 306, 308 and the further steps described above may be performed by computer hardware components.

What is claimed is:

1. A computer-implemented method for detecting whether a seat belt is used in a vehicle, the method comprising:
   acquiring an image of an interior of the vehicle;
   determining, based on the image, a plurality of sub-images;
   detecting, for the sub-images and in a sequential manner through the plurality of sub-images, whether a portion of the seat belt is present in the respective sub-image; and
   responsive to detecting that the portion of the seat belt is not present in the respective sub-image, terminating processing of the respective sub-image and determining that the seat belt is not used; or responsive to detecting that the portion of the seat belt is present in the respective sub-image, determining whether the seat belt is used based on the detecting.

2. The computer-implemented method of claim 1, wherein detecting whether the portion of the seat belt is present in the respective sub-image comprises determining an estimated probability that the portion of the seat belt is present in the respective sub-image.

3. The computer-implemented method of claim 2, the method further comprising:
determining, for at least one of the sub-images and based on a plurality of estimated probabilities for the respective sub-images, whether the seat belt is used.

4. The computer-implemented method of claim 1, wherein the method further comprises:
in response to at least one of detecting that the portion of the seat belt is occluded in the respective sub-image or determining that a detection of whether the portion of the seat belt is present is not possible for the current sub-image, terminating processing of the respective sub-image and determining that it is not possible to provide an indication whether the seat belt is used.

5. The computer-implemented method of claim 1, wherein the image is acquired by at least one of a 2D camera, a black-and-white camera, a color camera, a color-infrared camera, a near-infrared camera, or a Time-of-Flight camera.

6. The computer-implemented method of claim 1, the method further comprises:
determining, based on detecting that the portion of the seat belt is present in the respective sub-image, at least one of an occupancy status of a seat corresponding to the seat belt, a seat belt status, a routing status of the seat belt, or an occlusion status of the seat belt.

7. The computer-implemented method of claim 1, the method further comprises:
determining, based on the image, a respective location of at least one body key point,
wherein the plurality of sub-images are determined based on the respective location of the at least one body key point.

8. The computer-implemented method of claim 1, the method further comprises:
determining, based on the image, whether a portion of the seat belt is occluded; and
in response to determining that the portion of the seat belt is occluded, determining, based on the image, which portions of the seat belt are occluded.

9. The computer-implemented method of claim 8, the method, in response to determining that the portion of the seat belt is occluded, further comprises at least one of:
prompting a user to remove the occluding object;
adapting the determination of the sub-images so that the sub-images show unoccluded portions of the seat belt;
postponing the detecting of whether the portion of the seat belt is present in the respective sub-image until the portion of the seat belt is no longer occluded; or
predicting, based on an earlier detection, the results of the detecting of whether the portion of the seat belt is present in respective sub-image.

10. The computer-implemented method of claim 1, wherein detecting whether the portion of the seat belt is present in the respective sub-image is carried out using at least one of a classifier or a neural network.

11. The computer-implemented method of claim 1, wherein the plurality of sub-images are determined based on cropping the image and transforming the cropped image using a perspective transformation.

12. A system comprising:
at least one sensor configured to acquire an image of an interior of a vehicle; and
one or more processors configured to:
determine, based on the image, a plurality of sub-images;
detect, for the sub-images and in a sequential manner through the plurality of sub-images, whether a portion of the seat belt is present in the respective sub-image; and
responsive to detecting that the portion of the seat belt is not present in the respective sub-image, terminating processing of the respective sub-image and determining that the seat belt is not used; or
responsive to a detection that the portion of the seat belt is present in the respective sub-image, determine whether the seat belt is used based on the detection.

13. The system of claim 12, wherein the one or more processors, in detecting whether the portion of the seat belt is present in the respective sub-image, are further configured to determine an estimated probability that the portion of the seat belt is present in the respective sub-image.

14. The system of claim 13, wherein the one or more processors are further configured to:
determine, for at least one of the sub-images and based on a plurality of estimated probabilities for the respective sub-images, whether the seat belt is used.

15. The system of claim 12, wherein the one or more processors are further configured to:
determine, based on the image, a respective location of at least one body key point,
wherein the plurality of sub-images are determined based on the respective location of the at least one body key point.

16. The system of claim 12, wherein the one or more processors are further configured to:
determine, based on the image, whether a portion of the seat belt is occluded; and
in response to a determination that the portion of the seat belt is occluded, determine, based on the image, which portions of the seat belt are occluded.

17. The system of claim 12, wherein the one or more processors are further configured to:
in response to at least one of a detection that the portion of the seat belt is occluded in the respective sub-image or a determination that a detection of whether the portion of the seat belt is present is not possible for the respective sub-image, terminate processing of the current sub-image and determine that it is not possible to provide an indication whether the seat belt is used.

18. The system of claim 12, wherein the at least one sensor comprises at least one of a 2D camera, a black-and-white camera, a color camera, a color-infrared camera, a near-infrared camera, or a Time-of-Flight camera.

19. The system of claim 12, wherein the one or more processors are further configured to:
determine, based on a detection that the portion of the seat belt is present in the respective sub-image, at least one of an occupancy status of a seat corresponding to the seat belt, a seat belt status, a routing status of the seat belt, or an occlusion status of the seat belt.

20. A non-transitory computer-readable medium comprising computer-executable instructions that, when executed, cause a processor to:
obtain an image of an interior of the vehicle;

determine, based on the image, a plurality of sub-images;
detect, for the sub-images and in a sequential manner through the plurality of sub-images, whether a portion of the seat belt is present in the respective sub-image; and
responsive to detecting that the portion of the seat belt is not present in the respective sub-image, terminating processing of the respective sub-image and determining that the seat belt is not used; or
responsive to a detection that the portion of the seat belt is present in the respective sub-image, determine whether the seat belt is used based on the detection.

* * * * *